UNITED STATES PATENT OFFICE.

JOHN R. MacMILLAN, OF NIAGARA FALLS, NEW YORK, ASSIGNOR TO NIAGARA ALKALI COMPANY, OF NIAGARA FALLS, NEW YORK, A CORPORATION OF NEW YORK.

MAKING TRICHLORETHYLENE.

1,397,134.  Specification of Letters Patent.  Patented Nov. 15, 1921.

No Drawing.  Application filed August 2, 1920. Serial No. 400,767.

*To all whom it may concern:*

Be it known that I, JOHN R. MACMILLAN, a citizen of the United States, residing at Niagara Falls, in the county of Niagara and State of New York, have invented certain new and useful Improvements in Making Trichlorethylene, of which the following is a specification.

This invention relates to making trichlorethylene; and it comprises a process of dechlorinating acteylene tetrachlorid to form trichlorethylene with the aid of mixed alkalis, one of said alkalis being lime and another being potash or soda; all as more fully hereinafter set forth and as claimed.

"Acetylene tetrachlorid," or symmetrical tetrachlorethane, $CHCl_2.CHCl_2$, is readily manufactured from acetylene and chlorin by various methods. It is a rather high-boiling chloroform-like liquid, used as a solvent and for various other purposes. Its boiling point is about 147° C. By heating this body with alkali it can be dechlorinated with the production of various products according to the amount of chlorin removed. One of these bodies which is commercially valuable is produced by the removal of one chlorin atom only, the alkali removing H and Cl (which unite with it as HCl) and forming trichlorethylene, or $CHCl:CCl_2$. In practice, trichlorethylene is made commercially by this reaction on a tolerably large scale; the tetrachlorid being heated with an alkali in a still-like apparatus provided with means for cooling and partially condensing and returning effluent vapors. Conditions in the reflux condenser are so adjusted that whatever high-boiling vapors of the tetrachlorid are formed are condensed and returned, while the trichlorethylene vapors pass on for condensation elsewhere. This is practicable because of the relatively low boiling point of the trichlorethylene, namely, around 88° C.

In this operation however the yields are not as good as they should be because of side reactions taking place and producing unwanted products at the expense of the acetylene tetrachlorid; these products going forward with the trichlorethylene. It is difficult to remove exactly the amount of chlorin which should be removed; namely, exactly one-quarter of that contained in the tetrachlorid. Dechlorination may, for example, go so far as to produce dichloracetylene, $C_2Cl_2$; which is an explosive gas.

In the art it is customary to use either soda or lime as the dechlorinating alkali. Both have objections. The action of soda, either as caustic soda or sodium carbonate, is apt to be too violent and fargoing, so that great precautions must be taken to limit and restrain the action in order to obtain the desired product, trichlorethylene, in good yields. On the other hand, the action of lime is too slow unless pressure and high temperatures are used; and it is difficult on the large scale to find materials capable of withstanding both pressure and the reagents used. Without pressure, only small yields of trichlorethylene can be produced with the aid of lime.

I have found that I can secure better results and a greater economy of action by using both soda (or potash) and lime; the amount of lime being materially greater than that of the soda. For dechlorinating acetylene tetrachlorid to the desired degree for making trichlorethylene, as a matter of theory for each pound of tetrachlorid about 0.24 pound of caustic soda or 0.15 pound of caustic lime is required; that is, 168 pounds of tetrachlorid take 40 pounds or 28 pounds, respectively. In making my dechlorinating mixtures, I use less than the theoretical amount of soda and more than the theoretical amount of lime.

In a typical embodiment of my invention in dechlorinating acetelene tetrachlorid for the production of trichlorethylene, I use the alkalis in about the proportion of 90 parts by weight of slaked lime, or the equivalent amount (68 parts) of quicklime, and 10 parts of ordinary soda ash for every 100 parts by weight of tetrachlorid. The tetrachlorid and the alkalis, together with about 100 parts by weight of water, are placed in a converting still of any suitable material or design and heated together, vapors of tetrachlorid being condensed and refluxed in the usual manner. I obtain a large yield of trichlorethylene, approaching the theoretical, and the product is of good purity.

In using such a mixture of alkalis the dechlorinating action is regular and progressive. There is no violent reaction with production of by-products; and the tetrachlorid decomposes at about the same rate throughout the operation. The reason for this result is of course more or less a matter of speculation; but it is my impression that dechlorination is at first by caustic soda formed by causticization of the soda ash by the lime, this dechlorination of course being attended by the formation of sodium chlorid. As causticization is not instantaneous, probably this phase is spread over a considerable proportion of the total time required; this total time being, for the quantities stated, about 6 hours in operating at a temperature of about 100° C. The observed continuance of regular action may be because the sodium chlorid enhances the solubility of the lime; or because in a system containing both sodium chlorid in solution and lime in excess there is potentially, on equilibrium principles, always a certain amount of caustic soda present. I may note in this connection that my results may as a matter of fact be attained by a direct mixture of sodium chlorid and slaked lime in proportions corresponding to those previously given; but the action is slower in starting than when a little caustic soda or soda ash is used in the first place. In the beginning of the action the proportion, or mass, of tetrachlorid is, of course, greatest and at this time there is little tendency for caustic soda (and particularly in the dilution of the example) to institute the undesired fargoing reactions.

What I claim is:—

1. The process of partially dechlorinating acetylene tetrachlorid to form trichlorethylene which comprises heating tetrachlorid with lime in the presence of water and of a non-caustic sodium compound.

2. The process of partially dechlorinating acetylene tetrachlorid to form trichlorethylene which comprises heating tetrachlorid with lime and soda ash in the presence of water; the amount of soda ash being less than that corresponding to the amount of chlorin to be removed.

3. The process of partially dechlorinating acetylene tetrachlorid to form trichlorethylene which comprises heating together tetrachlorid, water, lime and soda ash in about the proportions of 100 parts tetrachlorid, 100 parts water, 90 parts slaked lime and 10 parts soda ash.

In testimony whereof, I have hereunto affixed my signature.

JOHN R. MacMILLAN.